United States Patent
Balmefrezol et al.

(10) Patent No.: US 9,203,254 B2
(45) Date of Patent: Dec. 1, 2015

(54) POWER MANAGEMENT CIRCUIT FOR A PORTABLE ELECTRONIC DEVICE INCLUDING USB FUNCTIONALITY AND METHOD FOR DOING THE SAME

(75) Inventors: Alexandre Balmefrezol, Sassenage (FR); Patrizia Milazzo, S. Agata Li Battiati (IT); Giuseppe Platania, Valverde (IT); Vincenzo Polisi, S. Maria di Licodia (IT)

(73) Assignee: ST-ERICSSON SA, Plan-les-Ouates (CH)

( * ) Notice: Subject to any disclaimer, the term of this patent is extended or adjusted under 35 U.S.C. 154(b) by 320 days.

(21) Appl. No.: 13/819,168

(22) PCT Filed: Aug. 25, 2011

(86) PCT No.: PCT/EP2011/004256
§ 371 (c)(1),
(2), (4) Date: Feb. 26, 2013

(87) PCT Pub. No.: WO2012/025231
PCT Pub. Date: Mar. 1, 2012

(65) Prior Publication Data
US 2013/0154550 A1 Jun. 20, 2013

Related U.S. Application Data

(60) Provisional application No. 61/421,512, filed on Dec. 9, 2010.

(30) Foreign Application Priority Data

Aug. 26, 2010 (EP) .................................... 10368034

(51) Int. Cl.
H01M 10/46 (2006.01)
H02J 7/00 (2006.01)
(Continued)

(52) U.S. Cl.
CPC ............... *H02J 7/0052* (2013.01); *G06F 1/263* (2013.01); *H02J 1/102* (2013.01); *H02J 7/0055* (2013.01); *H02J 7/0065* (2013.01); *H02J 7/0068* (2013.01); *H02J 2007/0062* (2013.01)

(58) Field of Classification Search
CPC ................ H02J 7/0055; H02J 7/0068; H02M 2001/0045
USPC ........... 320/107, 127, 128, 111; 323/299, 282
See application file for complete search history.

(56) References Cited

U.S. PATENT DOCUMENTS 7,560,898 B1 * 7/2009 Kranzen et al. ............... 320/107
8,145,198 B2 * 3/2012 Viaud et al. ................... 455/418

(Continued)

FOREIGN PATENT DOCUMENTS

WO 2008075140 A1 6/2008
WO 2009089230 A2 7/2009

*Primary Examiner* — Edward Tso
(74) *Attorney, Agent, or Firm* — Coats & Bennett, PLLC

(57) ABSTRACT

A Power Management Circuit for a portable electronic device comprising an internal battery to be charged either through a first interface or through an AC_DC conversion circuit. The circuit comprises a first buck/boost converter having a Switched Mode Power Supply (SMPS) mode which can be controlled either in a buck or a boost mode, said first buck/boost controller being associated with a first external coil for the purpose of embodying a battery charging circuit through a first interface (USB). The circuit further comprises a second buck/boost converter which can also be controlled either in a buck or a boost mode. Bypass circuits are used for performing, under control of a control circuit, the bypass of either the voltage of the battery or the voltage generated by said buck/boost controllers when in boost mode to a second interface (SIM/MMC).

12 Claims, 4 Drawing Sheets

(51) Int. Cl.
*G06F 1/26* (2006.01)
*H02J 1/10* (2006.01)

(56) References Cited

U.S. PATENT DOCUMENTS

| | | |
|---|---|---|
| 2004/0121793 A1* | 6/2004 | Weigele et al. ............... 455/522 |
| 2004/0184100 A1* | 9/2004 | Shahindoust ................ 358/1.15 |
| 2005/0057225 A1 | 3/2005 | Marquet |
| 2005/0253560 A1 | 11/2005 | Popescu-Stanesti et al. |
| 2008/0054855 A1 | 3/2008 | Hussain et al. |
| 2008/0265839 A1* | 10/2008 | Yang ............................. 320/128 |
| 2008/0278136 A1* | 11/2008 | Murtojarvi .................... 323/299 |
| 2010/0134964 A1* | 6/2010 | Smith et al. ................ 361/679.2 |
| 2010/0194344 A1* | 8/2010 | Greyling ....................... 320/128 |
| 2010/0205462 A1* | 8/2010 | Rauschmayer et al. ...... 713/300 |
| 2011/0195749 A1* | 8/2011 | Lan .............................. 455/558 |
| 2012/0157162 A1* | 6/2012 | Toufik et al. ............... 455/556.2 |

* cited by examiner

| | |
|---|---|
| Main Charger on<br>&<br>VBAT < 3.5 V | • SMPS Main in Buck mode to charge battery<br>• SMPS USB in boost mode to generate VIF voltage<br>• S(0), S(1) S(2) Open, S(3) closed<br>• VIF = VBUSBIS |
| Main Charger on<br>&<br>VBAT > 3.5 V | • SMPS Main in Buck mode to charge battery<br>• SMPS USB off<br>• S(0), S(2), S(3) open & S(1) closed<br>• VIF = VBAT |
| USB Charger on<br>&<br>VBAT < 3.5 V | • SMPS Main in Boost mode to generate VMainbis voltage<br>• SMPS USB in buck mode to charge battery<br>• S(0) closed & S(1), S(2), S(3) Open<br>• VIF = Vmainbis |
| USB Charger on<br>&<br>VBAT > 3.5 V | • SMPS Main off<br>• SMPS USB in buck mode to charge battery<br>• S(0), S(2), S(3) open & S(1) Closed<br>• VIF = VBat |
| OTG on<br>&<br>VBAT < 3.5 V | • SMPS Main in boost mode to generate Vmainbis<br>• SMPS USB in boost mode to generate OTG<br>• S(0) closed & S(1), S(2), S(3) open<br>• VIF = VMainbis |
| OTG on<br>&<br>VBAT > 3.5 V | • SMPS Main off<br>• SMPS USB in boost mode to generate OTG<br>• S(0), S(2), S(3) open & S(1) closed<br>• VIF = Vbat |
| OTG on<br>&<br>Main Charger ON<br>&<br>VBAT < 3.5 V | • SMPS Main in buck mode to charge battery<br>• SMPS USB in boost mode to generate OTG<br>• S(0), S(1), S(3) open & S(2) closed<br>• VIF = VBUS/OTG |

Fig. 3

| MainCH | 1 | 1 | 1 | 1 | 1 | 1 | 0 | 0 | 0 | 0 | 0 | 0 | 0 |
|---|---|---|---|---|---|---|---|---|---|---|---|---|---|
| USC CH | NA | NA | 1 | 1 | 0 | 0 | 1 | 1 | 1 | 1 | 0 | 0 | 0 |
| OTG | 1 | 1 | 0 | 1 | 0 | 0 | NA | 0 | 0 | 1 | 1 | 0 | 0 |
| VBAT>3.5V | 1 | 0 | 1 | 0 | 1 | 0 | 1 | 1 | 0 | 1 | 1 | 1 | 0 |
| Switch | S1 | S2 | S1 | S3 | S1 | S2 | S1 | S1 | S0 | S1 | S1 | S0 | S1 |
| VIF | VBAT | OTG | VBAT | VBUS BIS | VBAT | OTG | VBAT | VBAT | VMAIN BIS | VBAT | VBAT | VMAIN BIS | VBAT |
| Charger | Vmain | Vmain | Vmain | Vmain | Vmain | Vmain | USB | USB | USB | USB | 0 | 0 | 0 |

Fig. 4

POWER MANAGEMENT CIRCUIT FOR A PORTABLE ELECTRONIC DEVICE INCLUDING USB FUNCTIONALITY AND METHOD FOR DOING THE SAME

TECHNICAL FIELD

The invention relates to the field of electronic circuits and more particular to an Energy and Power management circuit for a telecommunication product, such as a mobile telephone offering different interfaces (USB, OTG, SIM . . . )

BACKGROUND ART

Energy and power management becomes a critical aspect for portable electronic devices, such as including mobile phones. Indeed, with the advent of additional—highly consuming—new functionalities and the increase in the performance of those devices, there is a general trend towards an increase of the power consumption.

Considering the field of mobile communications, a recent mobile telephone typically includes two separate battery charging circuits: the conventional AC/DC battery charging circuit and, recently, a DC/DC charging circuit for allowing the charging of the battery through the well-known Universal Serial Bus (USB) interface.

FIG. 1 illustrates the general architecture of a two-ways charging circuit for charging a battery 100 of a conventional mobile telephone. A first USB charger circuit is based on a buck converter 110 including two switches SA and SB referenced 111 and 112) in addition to a first coil 113 in series with a resistance 114.

On the other side, a second charging circuit is connected to the mains and comprises second buck converter 120 including two switches SC and SC (resp. 121 and 122) in additional to a second coil 123 in series with a resistance 124.

Coils 113 and 123 are electronic components which are dedicated to remain outside of the integrated chip and, for the sake of clarity, the different "balls" of the integrated semiconductor have been represented in the figures under the reference 191-199.

The circuit of FIG. 1 shows that, when the electronic mobile is plugged on the alternative mains, then it is the buck converter 120 of the figure which achieves recharging of battery 100 as known by the skilled man.

Conversely, the buck converter 110 is being active when the USB interface is plugged so as to receiver current which can be, after conversion by the buck converter 120, used for charging battery 100.

Since mobile phones are required to achieve conventional data transfer with other peripherals, it is required that the mobile phone supply a DC voltage to the external USB connector. To achieve this, buck converter 120 is used to serve as a pump charge or a boost converter so as to perform Step Up voltage conversion so as to generate the so-called On The Go (OTG) voltage required by the peripheral connected to the USB interface.

It can thus be seen that a modern mobile phone requires two distinctive buck converter, one being particularly a buck/boost converter for providing two battery charging circuits through mains/USB and also for achieving OTG compatibility.

Such flexibility has however one drawback which results from the need of additional circuits and, above all, the use of two external coils 113 and 123 required for embodying the buck/boost converter, thus increasing the manufacturing costs of the mobile phones. Despite this drawback mobile telephone manufacturers still favour the use of buck/boost converters which offer effective voltage conversion with respect to the more traditional linear converter.

It has recently been shown that a recent mobile telephone might require the possibility to connect additional functionalities, such as the possibilities to connect devices complying with the 3V SIM interface, the 3V MMC interface or any audio amplifier.

Such additional requirement would normally result in the need to introduce an additional buck/boost converter for converting the battery voltage to the required 3V SIM interface (for instance), which would thus need an additional external coil.

It is highly desirable to provide the possibility of offering additional interface without significantly increasing the manufacturing costs of the mobile telephone.

Such is the aim of the present invention.

SUMMARY OF THE INVENTION

It is an object of the present invention to provide a new circuit and architecture for an electronic device, such as a mobile telephone, which provides two distinctive charging circuits (USB and mains), OTG compatibility and further more complying with additional SIM or MMC requirements.

It is another object of the present invention to achieve a low cost but flexible energy and power management circuit allowing charging of the battery through mains/USC while allowing OTG, SIM and MMC interface compatibility.

It is a further object of the present invention to provide an Energy and Power Management Unit, comprising a two coils dual input DC/DC battery charger and a boost/bypass voltage regulator combined in a monolithic approach.

It is still another object of the present invention to provide an Energy and Power Management circuit which uses only two distinctive coils for embodying two distinctive battery chargers, and also complying with OTG and SIM or MMC requirements (for instance).

These and other objects of the invention are achieved by means of a Power Management circuit for a portable electronic device comprising an internal battery to be charged either through a first interface (USB) or through the conventional AC-DC conversion circuit.

The circuit comprises a first buck/boost converter having a Switched Mode Power Supply (SMPS) mode which can be controlled either in a buck or a boost mode and also associated with a first coil so as to serve as a first charging circuit (USB) for the battery.

The circuit further includes a second buck/boost converter which can also be controlled either in a buck or a boost mode and serving to charge the battery through the mains, the second converter being also associated with a second external coil for the purpose of carrying out a second charging circuit for the battery.

The circuit further comprising by-pass circuits, under control of a control circuit, for the purpose of performing a by-pass of either the voltage of the battery or the voltage generated by one of the two buck/boost controllers when in boost mode so as to generate a voltage which can be used as a further interface (SIM/MMC).

There is therefore achieved the possibility to generate, without requiring an additional coil and associated capacitor, OTG,=SIM/MMC interface while keeping the possibility of charging the battery.

Preferably, the first interface is a Universal Bus Interface (USB).

In one embodiment the second interface is a SIM interface. Alternatively, it can be a MMC interface for receiving a memory card.

Preferably, the Power Management circuit is used in a mobile telephone.

The invention also achieves a method of power management for a portable electronic device comprising an internal battery to be charged either through a USB interface or a AC/DC interface.

The method involves the steps of:
arranging a first buck/boost converter associated with a first external coil for the purpose of embodying a battery charging circuit through a first interface (USB), the buck/boost converter also achieving DC/DC up voltage conversion for converting the voltage from the battery to said USB interface so as to supply current to a peripheral connected to said USB interface;
arranging a second buck/boost converter associated with a second external coil for the purpose of embodying a second battery charging circuit through an AC/DC interface;
arranging said second buck/boost converter so as to perform boost conversion of the voltage of the batter for the purpose of generating a higher voltage;
the method further performing the steps of:
by-passing the voltage of the battery, or the high voltage generated by one of the two buck/boost converters (under control of a control signal;
sensing the voltage of the battery as well as the voltage appearing on said USB bus and said mains;
controlling, in response to said sensing step, said bypass so as to produce a voltage compliant with a second interface despite the actual level of said battery.

DESCRIPTION OF THE DRAWINGS

Other features of one or more embodiments of the invention will best be understood by reference to the following detailed description when read in conjunction with the accompanying drawings.

FIGS. 3 and 4 respectively illustrate the logic of the control circuit 250 for the purpose of generating the SIM or MMC voltage at the ball VIF.

DESCRIPTION OF THE PREFERRED EMBODIMENT

There will now be described the possibility to take advantage of the presence of the existing battery charging circuits, associated with their associated coils, generally taking a wide area outside the integrated circuit product, so as to achieve additional capabilities such as supplying current for a further SIM or MMC interface.

The invention will be particularly described in reference with a Universal Serial Bus interface which is today widely used for performing the charging of the battery, alternatively to the conventional AC/DC conversion.

Figure 1:
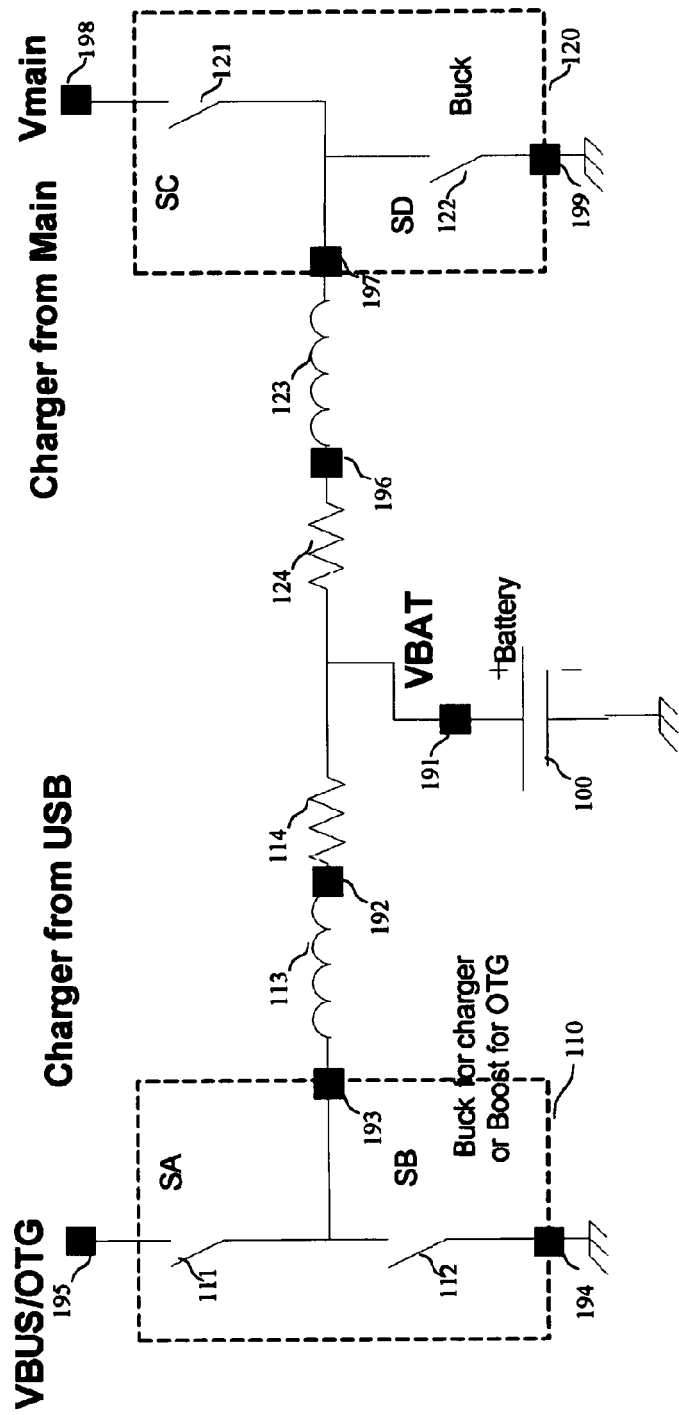
FIG. 1 illustrates a conventional architecture of a conventional energy and power management circuit for a mobile telephone.
Figure 2:
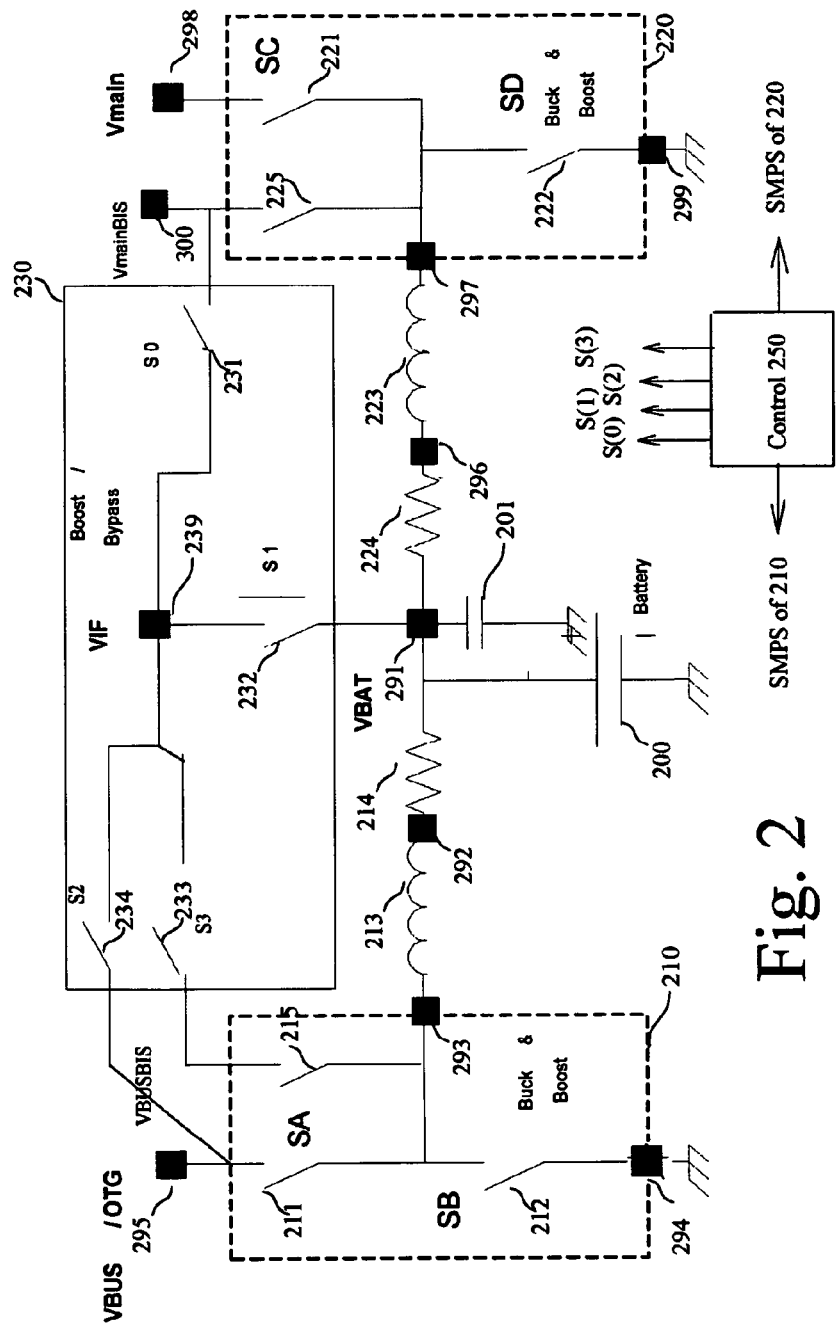
FIG. 2 illustrates the circuit of one embodiment of an Energy and Power Management circuit in accordance with the invention.

The embodiment illustrated in FIG. 2 thus includes two battery charging circuits based on two buck converters, 210 and 220 respectively, so as to achieve fast charging (typically 1500 mA/h) of a high capacity battery 200.

The circuit comprises a first buck/boost converter 210 associated with a first external coil 213 connected in series with a resistance 214 for the purpose of embodying a first battery charging circuit through an USB interface.

In order to comply with the so-called OTG requirement, the buck converter 210 is also arranged to be a boost converter so as to performing a UP conversion of the voltage of the battery in order to produce a higher voltage (5V) at the USB interface so as to supply current to a peripheral connected to said USB interface;

The Energy and Power management circuit further includes a second buck converter 220 which is associated with a second external coil 223 in series with a resistance 224 so as embody an alternate charging circuit connected to the conventional AC/DC circuit connected to the mains.

The second buck converter 220 is arranged, in the embodiment described in FIG. 2, so as to achieve a second boost conversion of the voltage of the battery so as to generate a voltage superior to said battery.

The Energy and Power Management circuit further comprises switching means for performing a by-pass of the either the voltage of the battery (which may vary), of the UP conversion of the voltage generated by one of the two buck/boost converters so as to provide a voltage which can be used for supplying current to a further interface, be it a MMC or a SIM interface.

The control of the switching means is achieved in response to the sensing of the level of the battery voltage, and also to a logic taking into account of the different use cases possible and which will now be explained in details in the description below.

Referring again to the FIG. 2, one sees that the Energy and Power Management (EPM) circuit takes the form of an integrated circuit which comprises a set of balls serving for the coupling of external components.

Ball 291: Terminal+ of the battery
Ball 292: second terminal of coil 213
Ball 293: first terminal of coil 213
Ball 294: Ground
Ball 295: VBUS/OTG available on the USB connector
Ball 296: second terminal of coil 223
Ball 297: first terminal of coil 223
Ball 298: Vmain coupled to the AC/DC converter
Ball 299: Ground
Ball 300: Vmainbis
Ball 239: VIF Buck/boost converter 210 comprises two switches SA and SB, respectively referred to as switch 211 and 212, each having two terminals.

Switch 211 comprises a first terminal connected to ball 295 (VBUS/OTG) available on the USB connector and also to a first terminal of a switch 234 S(2). Switch 211 has a second terminal which is connected to a first terminal of switch 212, the second terminal of which being connected to the ground via ball 294. The common terminal of switch 211 and 212 is also connected to a first terminal of a switch 215 serving to achieve the "boost" conversion of buck/boost converter, a second terminal of which (VBUSbis) being connected to a first terminal of a switch 233 S(3).

The second terminal of both switches 233 S(3) and 234 S(2) are connected to ball 239 VIF which is used for supplying DC voltage to a second interface, such as a 3V SIM or a 3V MMC interface.

In addition, the common terminal of switch 211 and 212 is connected to ball 293 connected to a first terminal of an external coil 213, a second terminal of which is connected to ball 292 and then to a first terminal of a resistor 214. Resistor 214 has a second terminal which is connected to the VBAT ball 291.

A decoupling capacitor 201 is also connected between ball VBAT 291 and the ground.

Considering now second buck/boost converter 220, one sees that the latter comprises two switches SC and SD, respectively referred to as switch 221 and 222, each having two terminals.

Switch 221 comprises a first terminal connected to ball 298 (Vmain) receiving the output of the AC/DC converter. Switch 221 has a second terminal which is connected to a first terminal of switch 222, the second terminal of which being connected to the ground (299). The common terminal of switch 221 and 222 is also connected to a first terminal of a switch 225 serving to achieve the "boost" conversion of buck/boost converter 220, a second terminal of which (Vmainbis) being connected to a first terminal of a switch 231 (S0).

The second terminal of switch 231 S(0) is connected to ball 239 VIF.

In addition, the common terminal of switch 221 and 222 are connected to ball 297 connected to a first terminal of external coil 223, a second terminal of which is connected to ball 296 and then to a first terminal of resistor 224. Resistor 224 has a second terminal which is connected to the VBAT ball 291.

In addition to the two buck/boost converters 210 and 220, one sees that the EPM circuit comprises a boost/Bypass circuit 230 which comprises the different switches S0, S1, S2 and S3 allowing the generation of the VIF voltage in accordance with the different use cases.

A control circuit 250 is associated which comprises sensing means for sensing the value of the voltage at different points, including the VBAT the Vmain and the VBUS/OTG.

In accordance with the voltage being sensed, the control circuit provides the control signals to the different switches S0-S3 so as to achieve the generation of the voltage required at the VIF ball, in accordance with the logic defined in FIGS. 3 and 4.

A. Considering for instance the case where the main charger is to be activated (voltage sensed on ball Vmain 298) and the voltage of the battery is inferior than 3.5 Volts, then control circuit 250 controls the Switched Mode Power Supply (SMPS) of converters 210 and 220 in boost and buck modes, respectively, so as to generate the VIF voltage and simultaneously charge the battery via the mains. Control logic 250 further controls the switches S(0), S(1), S(2) and S(3) as follows:

S(0), S(1), S(2) open;
S(3) closed
What results in VIF=Vbusbis

B. If the main charger is to be activated while the voltage of the battery is sensed to be superior than 3.5 Volts, then the control circuit 250 switches off the SMPS of the USB and controls the SMPS of converter 220 in buck mode. Control logic 250 further controls the switches S(0), S(1), S(2) and S(3) as follows:

S(0), S(2), S(3) open;
S(1) closed
What results in VIF=Vbat

C. Considering for instance the case where the USB charger is to be activated (voltage sensed on ball VBUS/OTG 295) and the voltage of the battery is inferior than 3.5 Volts, then control circuit 250 controls the Switched Mode Power Supply (SMPS) of converters 210 and 220 in buck and boost modes, respectively, so as to generate the Vmainbis voltage and simultaneously charge the battery via the USB interface. Control logic 250 further controls the switches S(0), S(1), S(2) and S(3) as follows:

S(1), S(2), S(3) open;
S(0) closed
What results in VIF=Vmainbis

D. If the USB charger is to be activated while the voltage of the battery is sensed to be superior than 3.5 Volts, then the control circuit 250 switches off the SMPS of buck converter 220 and controls the SMPS of converter 210 in buck mode. Control logic 250 further controls the switches S(0), S(1), S(2) and S(3) as follows:

S(0), S(2), S(3) open;
S(1) closed
What results in VIF=Vbat

E. Now considering the case where OTG is to be on while the voltage of the battery is sensed to be inferior than 3.5 Volts, then control circuit 250 controls the Switched Mode Power Supply (SMPS) of both converters 210 and 220 in boost modes, so as to generate Vmainbis and the OTG. Control logic 250 further controls the switches S(0), S(1), S(2) and S(3) as follows:

S(1), S(2), S(3) open;
S(0) closed
What results in VIF=Vmainbis

F. If the OTG is to be on while the voltage of the battery is sensed to be superior than 3.5 Volts, then control circuit 250 switches off converter 220 and controls the Switched Mode Power Supply (SMPS) of converters 210 in boost mode so as to generate OTG. Control logic 250 further controls the switches S(0), S(1), S(2) and S(3) as follows:

S(0), S(2), S(3) open;
S(1) closed
What results in VIF=Vbat

G. At last, if the main charger is to be activated while the voltage OTG has to be generated and the battery is sensed to be inferior than 3.5 Volts, then the control circuit 250 controls converters 210 and 220 in boost and buck modes, respectively, so as to generated OTG while charging the battery via the mains. Control logic 250 further controls the switches S(0), S(1), S(2) and S(3) as follows:

S(0), S(1), S(3) open;
S(2) closed
What results in VIF=VBUS/OTG

On therefore sees the great flexibility of the circuit which allows, without requiring any additional coil, the possibility of various charging possibilities and OTG/SIM/MMC voltage generation.

Advanced Li-ion Mobile phone batteries have a voltage varying from 2.3 V up to 4.5 V minimum. Despite such significant variation of the battery voltage, the embodiment described below further provides compliance with 3V SIM interface, 3V MMC interface or even any other audio amplifier.

The invention allows the minimization of the number of external components (2 coils and 4 capacitors) to reduce cost and size and to integrate both functions in the same monolithic device.

Three significant functions are thus achieved without significant increase in the manufacturing costs:

USB connection to transfer data with other peripherals (DC-DC step-up converter).

Battery charging through USB host or charger (DC-DC step-down converter).

Buck boost converter

Thanks to the circuit described above, there is only required one coil associated with one capacitor so as to perform the following functions:

DCDC down converter when an USB charger is connected and the battery has to be charged DCDC up converter when an USB OTG voltage has to be generated starting from mobile phone battery.

Hybrid DC/DC Buck boost converter when none of the above function above are required DCDC down converter when an AC/DC charger is connected and the battery has to be charged DCDC up converter when an MAIN voltage has to be generated starting from mobile phone battery to supplies accessories Hybrid DC/DC boost/Bypass converter when none of the above function above are required*

Can be extended to BUCK/BOOST with LDO introduction

Since all those functions are not active at the same time, the circuit which was described above allows the sharing of the external components as well as the internal switch so as to reduce the cost and size on silicon board.

The invention claimed is:

1. A power management circuit for a portable electronic device comprising an internal battery chargeable either through a first interface or through an AC-DC conversion circuit, said power management circuit comprising:
  a first buck/boost converter having a Switched Mode Power Supply (SMPS) mode which is configured to be controlled either in a buck or a boost mode, said first buck/boost converter being associated with a first external coil for embodying a battery charging circuit where the internal battery is chargeable through the first interface;
  a second buck/boost converter having a Switched Mode Power Supply (SMPS) mode configured to be controlled either in a buck or a boost mode, said second buck/boost converter being associated with a second external coil for embodying a second battery charging circuit where said internal battery is chargeable through the AC/DC conversion circuit;
  a by-pass circuit for performing a by-pass of either the voltage of said internal battery or of the voltage generated by said buck/boost controllers converters when in the boost mode to a second interface, controlled by a control signal; and
  a control circuit for controlling the Switched Mode Power Supply (SMPS) mode of said first and second buck/boost converters and for controlling said by-pass circuit so as to generate a converted voltage to said second interface.

2. The power management circuit according to claim 1 characterized in that said first interface is a Universal Serial Bus Interface.

3. The power management circuit according to claim 1 characterized in that said second interface is a SIM interface.

4. The power management circuit according to claim 1 characterized in that said second interface is a MMC interface.

5. The power management circuit according to claim 2 characterized in that said internal battery is a Li-Ion battery.

6. A portable terminal equipment comprising a power management circuit including an internal battery which can be charged either through a USB interface or an AC/DC interface, said power management circuit comprising:
  a first buck/boost converter having a Switched Mode Power Supply (SMPS) mode configured to be controlled either in a buck or a boost mode, said first buck/boost converter being associated with a first external coil for embodying a battery charging circuit where the internal battery is chargeable through the first interface;
  a second buck/boost converter having a Switched Mode Power Supply (SMPS) mode configured to be controlled either in a buck or a boost mode, said second buck/boost converter being associated with a second external coil for embodying a second battery charging circuit where said internal battery is chargeable through the AC/DC interface;
  a by-pass circuit for performing a by-pass of either the voltage of said internal battery or the voltage generated by said buck/boost converters when in the boost mode to a second interface, controlled by a control signal; and
  a controlling circuit for controlling the Switched Mode Power Supply (SMPS) mode of said first and second buck/boost converters and also for controlling said by-pass circuit so as to generate a converted voltage to said second interface.

7. A telecommunication network device characterized in that it includes the power management circuit as in claim 1.

8. A method for generating the power management of a portable electronic device comprising an internal battery chargeable either through a USB interface or through an AC/DC interface, said method comprising the steps of:
  arranging a first buck/boost converter associated with a first external coil for embodying a battery charging circuit where the internal battery is chargeable through the USB interface, wherein said buck/boost converter also achieves a DC/DC up voltage conversion for converting the voltage from the internal battery to said USB interface so as to supply current to a peripheral unit connected to said USB interface;
  arranging a second buck/boost converter associated with a second external coil for embodying a second battery charging circuit where said internal battery is chargeable through the AC/DC interface;
  arranging said second buck/boost converter so as to perform boost conversion of the voltage of the internal battery to generate a higher voltage;
  by-passing the voltage of the internal battery, or the voltage generated by one of the two buck/boost converters responsive to a control signal;
  sensing the voltage of the internal battery as well as the voltage appearing from said USB interface and said AC/DC interface; and
  generating said control signal in response to said sensing of the voltage of the internal battery to provide the higher voltage to another interface.

9. The method according to claim 8 characterized in that said internal battery is a Li-Ion battery.

10. The method according to claim 8 characterized in that said second interface is a 3V SIM interface.

11. The method according to claim 8 characterized in that said second interface is a 3V MMC interface.

12. A mobile telephone including circuits for performing the method of claim 8, further including a transceiver for transmitting and receiving wireless signals and a processing circuit for processing the wireless signals.

* * * * *

UNITED STATES PATENT AND TRADEMARK OFFICE
CERTIFICATE OF CORRECTION

PATENT NO. : 9,203,254 B2
APPLICATION NO. : 13/819168
DATED : December 1, 2015
INVENTOR(S) : Balmefrezol et al.

It is certified that error appears in the above-identified patent and that said Letters Patent is hereby corrected as shown below:

In the Claims

In Column 7, Line 47, in Claim 1, delete "controllers converters" and insert -- converters --, therefor.

Signed and Sealed this
Third Day of December, 2019

Andrei Iancu
*Director of the United States Patent and Trademark Office*